United States Patent Office 2,805,919
Patented Sept. 10, 1957

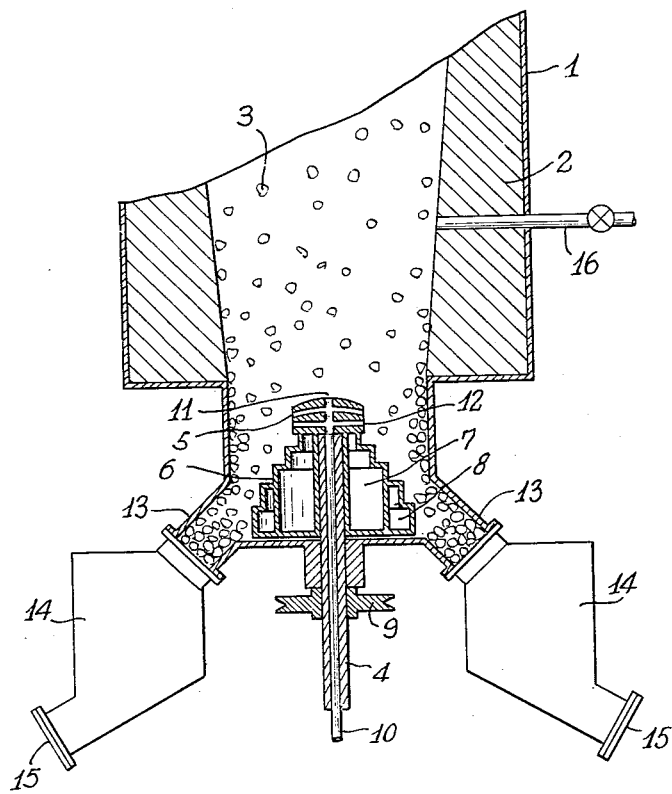

2,805,919

PROCESS FOR CHLORINATING TITANIUM-BEARING MATERIALS

Hiroshi Ishizuka, Ashiya-shi, Japan

Application November 15, 1954, Serial No. 468,938

2 Claims. (Cl. 23—87)

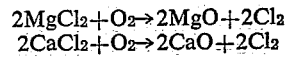

The present invention relates to a process for chlorinating titanium bearing material and the like, in which the raw material is reacted on by chlorine or chlorine-containing substances in the presence of carbonaceous materials, such as charcoal and the like, at elevated temperatures, and in the chlorinating zone titanium, vanadium, iron and the like are converted in the chlorides thereof to gasify, and then the materials having been subjected to the chlorination are reacted on by oxygen or oxygen containing gas in the oxidizing zone to oxidize the chlorides, and the liberated chlorine is used directly for the chlorination of titanium, vanadium and the like in the chlorinating zone, and also to an apparatus for carrying out above-said process.

According to the present invention, a shaft furnace as described later is employed for reacting chlorine on the materials containing titanium, zirconium and the like at high temperatures to vaporize them as chlorides and subsequently for condensing to recover them. Namely, the apparatus is so constructed as below: The chlorine gas is blown in the furnace through a lower portion of the furnace; a semi-spherical, rotating, continuous, discharging device is provided on the hearth for withdrawing the residue consecutively and prevented from contact with the outside air; further, from the bottom of the furnace, oxygen or oxygen-containing gas is blown in to oxidize the chloride not vaporized at the working temperature and liberate chlorine, which is usable for the chlorination, and to convert the residue into the oxides capable of easy handling.

The object of the invention is to decrease the consumption of chlorine and fuel, enable the use of cheaper raw materials, provide easy continuous operation with simple apparatus, besides facilitate reactional operation and thereby to provide an advantageous method and apparatus for carrying out said process from both technical and economical point of view.

Heretofore, it has been practiced industrially first to mix, for instance, titanium bearing slag with powdered charcoal as well as a binding agent, make briquettes therefrom and subject those briquettes to sintering, and then to gasify titanium tetrachloride by reacting chlorine thereupon, condense and recover in the shaft furnace. However, titanium bearing iron sand is melted and refined, and the iron contained therein is separated in the form of pig iron; and if thus obtained high titanium slag is chlorinated, the slag constituents at the temperature, e. g. 400° to 800° C. will be converted to chloride consecutively in the order of FeO, $TiO_2$, $SiO_2$ and $Al_2O_3$. When titanium oxide is gasified completely by converting it to titanium tetrachloride, the iron chloride and vanadium chloride are likewise gasified, while the magnesium chloride and calcium chloride remain as solids.

In the prior process, therefore, the reactional residue comprises also such chlorides as magnesium chloride and calcium chloride. Hence, the operation of withdrawing the residue from the lower portion of the furnace is not only difficult, but also the loss of chlorine is very high, and besides special consideration is needed for the apparatus for the disposition of residue.

On the contrary, according to the present invention, raw material is charged at the top of a shaft chlorinating furnace and chlorine gas is blown in the lower portion of the furnace, whereby titanium, vanadium, iron are gasified in the form of chlorides and oxygen, for instance in dry state, are blown in the furnace through the bottom, towards the reactional residue containing magnesium chloride, calcium chloride, etc. The reaction taking place at this moment is as follows:

$$2MgCl_2 + O_2 \rightarrow 2MgO + 2Cl_2$$
$$2CaCl_2 + O_2 \rightarrow 2CaO + 2Cl_2$$

The example of the practice according to the present invention is as follows:

$TiO_2$ 55.6, C 25.3, FeO 7.2, $SiO_2$ 44.0, MgO 3.5, $Al_2O_3$ 3.2, was charged in the chlorinating furnace, and 5.2 tons chlorine was blown in. The reaction was carried out for 24 hours, at the reaction temperature of 700° C. The titanium tetrachloride thus obtained was introduced in the condenser, condensed and liquified. Then, air was blown in from the lower portion of the furnace at the rate of 800 liters per minute for about 2 hours, and thereafter the reactional residue was discharged. Said discharge of residue was repeated three times during the operation. However, 3.8 tons titanium tetrachloride was obtained. The residue amounted to 1.2 tons and was extremely compact, grayish white and easy to discharge.

However, when air was not blown in from the lower portion, the titanium tetrachloride was 3.4 tons and the residue was 1.7 tons. And the residue was yellowish black, and had high viscosity and showed white fume and chlorine smell. The discharge operation for this was remarkably difficult.

In the following, the apparatus of this invention is described with reference to the accompanying drawing: Inside of the furnace-casing 1, a furnace-lining 2 of refractory material is provided and thereby the upper portion of furnace is excluded from the atmospheric air, so that the evolved gas may not leak out. On the other hand, a condenser is provided for sucking up the vaporized chlorides to condense and recover the chlorides. The raw material, e. g. briquettes 3 made by admixing charcoal powder with titanium slag is charged in a chlorinating shaft furnace equipped with a raw material-charging-device of an air tight type; and a chlorine tube 16 is provided in the lower portion of the furnace, through which chlorine is blown in and thus the raw material is converted to chlorides and vaporized. A semi-spherical-rotating continuous discharging device is equipped in the furnace hearth, consisting of a rotating spindle 4 provided with a spherical head 5 and a spherical body 6. The spherical body is cooled with water on the spherical portion projecting into the furnace by means of water-jackets 7 and 8. The spherical member rotates revolving spindle 4 by a revolving wheel 9. And an oxygen tube 10 is provided in the revolving spindle 4 at the furnace bottom, for instance, as in the drawing, and oxygen is ejected from the part of the cone head 5. The oxygen reacts then on the residue containing chlorides, liberating chlorine. The liberated chlorine acts similarly to the blown-in chlorine from the chlorine tube 16, that is, both chlorine conducts the chlorinating reaction.

The residue having been converted into oxides enters the residue receptacle 14 consecutively through the residue-falling port 13 by the rotation of the semi-spherical body and then it is discharged through the residue-discharging opening 15.

It should be noted, that according to the present invention not only the chlorine, but also chlorine containing material, for instance phosgene, silicium tetrachloride and the like may be used in the chlorination, which react readily with other oxides to produce chlorides. It is also apparent that there are provided according to this invention a chlorinating zone wherein titanium is chlorinated and an oxidizing zone, wherein the reactional materials are oxidized to liberate chlorine, which is utilized for the chlorination and the residue is converted to oxides to facilitate the discharge operation, and further the furnace temperature is raised, which increases the efficiency a great deal as compared with the usual manner of chlorinating operation.

Since the present invention is carried out in the apparatus (which apparatus is also a part of this invention as detailed in the foregoing description) the discharging of residue after the chlorination, which has usually been a difficult operation, can be carried out continuously with exclusion from the atmospheric air, and since the loss of chlorine is avoided by blowing-in of oxygen or air and the residue is converted to a material consisting chiefly of oxides and permitting easier handling, this invention may be said to have attained a high industrial value and brought a great improvement to the chlorinating operation.

What I claim is:

1. Continuous process for chlorinating titaniferous material containing metal compound impurities to obtain titanium tetrachloride, which comprises reacting said titaniferous material with a gaseous chlorinating agent at an elevated temperature in a chlorinating zone of a furnace in the presence of a carbonaceous reducing agent to volatilize titanium in the form of chloride and reacting the residue from said chlorination comprising the resulting non-volatile metal chlorides with gaseous oxygen introduced into a portion of said furnace below the chlorinating zone in sufficient amount to convert said non-volatile metal chlorides to the corresponding metal oxides and thereby to liberate chlorine gas which thereupon rises to the chlorinating zone and participates in the chlorination operation of the titaniferous material.

2. Continuous process for chlorinating titaniferous material containing impurity calcium and magnesium compounds to obtain titanium tetrachloride which comprises reacting said titaniferous material with chlorine gas at an elevated temperature in a chlorinating zone of a furnace in the presence of a carbonaceous reducing agent to volatilize titanium in the form of chloride and reacting the residue from said chlorination comprising the formed calcium chloride and magnesium chloride with gaseous oxygen introduced into a portion of said furnace below the chlorinating zone in sufficient amount to convert said calcium chloride and said magnesium chloride to their corresponding oxides and thereby to liberate chlorine gas which thereupon rises to the chlorinating zone and participates in the chlorination operation of the titaniferous material.

References Cited in the file of this patent
UNITED STATES PATENTS

| | | |
|---|---|---|
| 594,540 | Kitson | Nov. 30, 1897 |
| 1,845,342 | Saklatwalla | Feb. 16, 1932 |
| 1,979,280 | Mitchell | Nov. 6, 1934 |
| 2,184,887 | Muskat et al. | Dec. 26, 1939 |
| 2,185,218 | Muskat et al. | Jan. 2, 1940 |
| 2,657,976 | Rowe et al. | Nov. 3, 1953 |
| 2,667,409 | Hubmann | Jan. 26, 1954 |
| 2,701,180 | Krchma | Feb. 1, 1955 |